United States Patent
Brandt et al.

(10) Patent No.: US 8,150,780 B2
(45) Date of Patent: Apr. 3, 2012

(54) METHOD FOR CALCULATING CAR HIRE

(75) Inventors: Gary Edward Brandt, Portland, OR (US); Gary Alan Snyder, Lake Oswego, OR (US); Robert Bradley Ashton, Beaverton, OR (US)

(73) Assignee: The Greenbrier Management Services, LLC, Lake Oswego, OR (US)

( * ) Notice: Subject to any disclaimer, the term of this patent is extended or adjusted under 35 U.S.C. 154(b) by 682 days.

(21) Appl. No.: 11/521,818

(22) Filed: Sep. 15, 2006

(65) Prior Publication Data

US 2008/0071557 A1   Mar. 20, 2008

(51) Int. Cl.
*G06Q 30/00* (2012.01)
(52) U.S. Cl. .......................................... 705/330
(58) Field of Classification Search .................... 705/330
See application file for complete search history.

(56) References Cited

U.S. PATENT DOCUMENTS

| | | | |
|---|---|---|---|
| 6,687,679 B1 * | 2/2004 | Van Luchene et al. | 705/14.13 |
| 7,606,744 B1 * | 10/2009 | Foster | 705/34 |
| 2004/0176997 A1 * | 9/2004 | Podgurny et al. | 705/14 |
| 2004/0225510 A1 * | 11/2004 | McGovern | 705/1 |
| 2005/0071222 A1 * | 3/2005 | Bigus et al. | 705/14 |
| 2006/0259363 A1 * | 11/2006 | Jhetam | 705/14 |

OTHER PUBLICATIONS

The Official Railway Equipment Register, Circular No. OT-10, of the Safety & Operations, Business Services, American Railroads Building, Washington, DC, effective as of Oct. 1, 2005, and consisting of 73 pages.*

*The Official Railway Equipment Register*, Circular No. OT-10, of the Safety & Operations, Business Services, American Railroads Building, Washington, D.C., effective as of Oct. 1, 2005, and consisting of 73 pages.

* cited by examiner

*Primary Examiner* — Nathan Erb
(74) *Attorney, Agent, or Firm* — Chernoff Vilhauer McClung & Stenzel, LLP

(57) ABSTRACT

An automated system having a memory storing a plurality of potential reclaims in a queue, and a processor that automatically selects which of the plurality of potential reclaims to apply to a movement cycle of a unit of railroad transport equipment, by processing mutually exclusive combinations of potential reclaims, and so as to maximize the total value of the applied reclaim(s).

8 Claims, 6 Drawing Sheets

METHOD FOR CALCULATING CAR HIRE

CROSS-REFERENCE TO RELATED APPLICATIONS

Not applicable.

BACKGROUND OF THE INVENTION

Railroad transport equipment is typically expensive. For example, the per-unit cost of a railroad car may range from between $50,000 to $250,000, depending on the type and design of the car. Specific examples of railroad transport equipment might include railroad cars, intermodal containers such as ocean and other shipping containers that are placed either on flat cars or specially constructed well cars for ground transport, and transport appurtenance, such as racks, inserted into rail cars to support automobiles. This list is not intended to be exhaustive. Though many different owners of railroad transport equipment build and/or purchase their own individual units, those units mostly operate over the same network of railroad track as do units owned by other entities. Accordingly, it would be very inefficient for each railroad transport company, such as a railroad, to transport cargo using only its own equipment. Instead, in order to increase the efficient utilization of resources, the railroad industry in North America shares railroad transport equipment. In other words, a railroad transport company, when transporting cargo on behalf of a customer, may utilize any transport equipment available, irrespective of who owns that equipment. Essentially, this means that the owner of a railroad car or other type of transport equipment will simply release the equipment into commerce, and be compensated for another's use of that equipment as it is used. Such compensation is known in the industry as "car hire."

Generally speaking, from the perspective of a railroad transport company using another's railroad transport equipment, there are four types of transport equipment owners to be potentially compensated. Foreign railroads are competing railroads that own shared transport equipment. Private equipment owners build and/or purchase shared equipment, but do not own any physical track on the shared network. TTX (or Trailer Train Company) is a company specifically formed to provide transport equipment and management services to North American railroads, and is owned by North America's leading railroad companies, each of which has stock in TTX. Finally, intermodal equipment owners provide equipment other than rail cars that are used when transporting cargo, such as ocean containers and the like. Compensation made to these owners for the use of their respective pieces of transport equipment is negotiated, and varies not only by the type of owner, but also by the value, age, size, etc. of the specific equipment used.

The importance of accurate car hire calculations cannot be overstated. According to industry estimates, over $3 billion is spent annually to compensate owners of transport equipment, and is considered to be the third highest operating cost of individual railroads, behind labor and fuel. In terms of volume, over two million pieces of registered transport equipment are available for shared use, and for which compensation must be calculated.

From a management perspective, accounting for the car hire amounts owed among operators and owners is a daunting task, not only for the sheer number of units involved—which can be as high as tens of thousands of pieces of equipment used by a railroad in a given month—but also because individual units change hands so frequently. To facilitate both the accurate and uniform calculation of car hire, or amounts owed to equipment owners, a company called RailInc maintains a database of movements of transport equipment. This database is called the Telerail Automated Information Network (TRAIN II) and records both a unique identifier for each shared unit of transportation equipment along with interchange information recording where and when specific transport units are transferred between users. From this information, accurate records of who is using what equipment, for what periods of time, and for how many miles, can in theory be maintained. Furthermore, most rates charged for available pieces of transport equipment are maintained in a Car Hire Accounting Rate Master (CHARM) file. Though the information in these databases is accessible by both the users of the equipment and the owners of the equipment, it is the responsibility of the users (the transporters) to calculate the amount of car hire they owe to each respective owner whose equipment was used in a given month.

Conceptually, the calculation of car hire owed to an owner by a transporter should be a simple process. Car hire rates are applied on both a per-hour basis (or in the case of intermodal equipment, a per day basis) and a per-mile basis. In other words, the amount of car hire owed is the sum of a negotiated hourly rate multiplied by the hours used, and a negotiated mileage rate multiplied by the number of miles the transporter moved the applicable transport unit. Once the time and mileage start and end points are deduced from the RailInc database, a net amount owed for use of the unit can be calculated.

In practice, however, several factors complicate this computation. First, each railroad transport company must update interchange information with RailInc in a timely manner. Unfortunately, many such companies are not as meticulous as would be ideal, and interchange gaps in RailInc's database commonly occur. To address this issue, the North American railroad industry has developed an automated process called LCS (Liability Continuity System) that analyzes the data from TRAIN II, identifies missing interchange information, and assigns appropriate liability. Specifically, each railroad transporter is required to report an interchange within 120 hours of its occurrence. Each night, the LCS system analyzes reportings that are older than 120 hours and creates LCS messages for transport equipment. If one party to an equipment interchange does not report, the information provided by the other party is used. If neither party reports, LCS attempts to create continuity by analyzing the next three reported moves.

More problematic to the accurate computation of car hire amounts owed are reclaims. Reclaims are offsets to amounts of car hire owed, and are either specifically defined in uniform car hire rules adopted by the rail industry, or are specifically negotiated among parties. As one example, Car Hire Rule 22 allows for a reclaim if an empty car does not move due to the loading station being full, closed etc. As another example, two parties may negotiate special reclaims that permit 120 free hours a month. As a third example, a negotiated reclaim may reduce either, or both, the per-mile rate or the per-hour rate for specific cars, types of commodities transported, etc. While the computation of a base car hire amount is straightforward, the computation of any offsetting reclaims can be complicated, not only computationally due to the varying types of reclaims, but also administratively because often the only party documenting the reclaim is the transporter, making verification by the owner somewhat difficult. Accordingly, existing car hire calculation systems limit themselves to the application of a single reclaim per piece of equipment at any given time, and also require that the transporter document any desired reclaim at the time an interchange is reported, using a code specific to the reclaim being asserted. For example, when transporter X reports acquiring equipment Y at point A and time B and releasing the equipment at point C and time D, the transporter will enter a single applicable reclaim code for that movement. In this manner, the code can be used to calculate the applicable offset against amounts owed for the use of the equipment, and is documented contemporaneously with the movement of the equipment for verification by the equipment owner.

Using information from the respective TRAIN II, CHARM, and LCS systems, net amounts of car hire owed are calculated by transporters and reported back to RailInc by the 40$^{th}$ day following the month being calculated. Almost all Class I railroads, defined as those having annual operating revenues at or above $50 million (in 1978 dollars), and including BNSF, CN, UP and others, use their own proprietary systems. Similarly, two Class II railroads, defined as railroads with annual operating revenues between $10 million and $50 million (again in 1978 dollars) also use proprietary systems. Most of the remaining railroads pay third parties to calculate the amount of car hire they owe. Such third parties include Railcar Management Inc. (RMI) and Intellitrans, LLC.

Both the proprietary and third party payables systems mentioned above are not as accurate as is desired. Specifically, they tend to undervalue the amount of reclaims applicable to car hire, and therefore lead railroads to pay more car hire than is warranted. This occurs primarily for two reasons. First, each system can only apply a single reclaim to each car possession. Second, an operator may inadvertently omit entering a reclaim mode or may mistype the reclaim mode causing the reclaim to be invalidated. In either instance, an applicable reclaim is never applied, costing the railroad money.

What is desired, therefore, is an improved payables system for calculating the amount of car hire owed by a railroad transporter to an owner of transport equipment.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
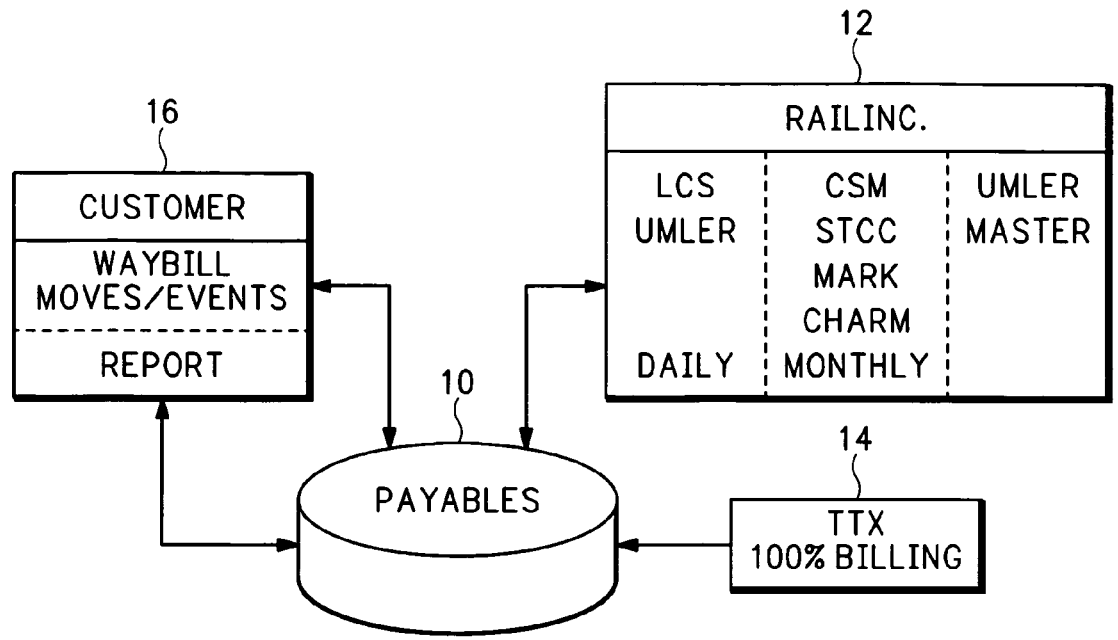
FIG. 1 shows an exemplary payables system disclosed in the present application that uses data received from a customer and third party databases to produce car hire payables reports on behalf of the customer.

In this specification, the term "railroad" should be understood to encompass any entity engaged in the commercial transport of cargo over railroad track using railroad transport equipment. In addition, the following terms will be accorded the meanings that respectively follow them, which should be understood by those familiar with the art. These meanings are provided to facilitate understanding of the specification by those unskilled in the art, as well. The disclosed systems for calculating car hire may preferably be used in North America, which has adopted a standardized car hire calculation methodology with relatively esoteric rules and pre-existing databases/computer systems that may interact with the disclosed system specifically described herein. However, to the extent that the aforementioned rules may change, or that similar car hire systems are adopted elsewhere in the world, the disclosed system may be modified to accommodate such variances, and the use of the following specific terminology does not limit the scope of the subject matter claimed.

Accounting Month: The month for which the disclosed payables system is currently computing amounts due. Because a railroad in North America is given a month and 10 days to report payables data to RailInc, this is most likely the month prior to the actual date on which the payables system is currently processing.

Actual Route-Mileage: The calculation of mileage, to which a mileage rate applies, along the actual route a piece of transport equipment traveled during a possession. Actual-Route is distinguished from Short Route Mileage.

Car Hire: The requirement that a railroad reports to an owner of transport equipment for the use of that equipment. Examples of such transport equipment include, but are not limited to, rail cars, intermodal equipment, and appurtenances. The term "car hire amount" refers to the net amount owed an owner for use of a unit or piece of transport equipment. The term "initial car hire amount" is used to refer to an preliminary amount owed prior to any reclaims being applied against that initial car hire amount.

Car Hire Accounting Rate Master (CHARM): The official source of time and mileage rates on freight cars, CHARM contains rates effective for a current month, and is updated monthly. CHARM rates include both default rates for freight cars and special negotiated rates dependent on defined circumstances.

Centralized Station Master File (CSM): A geographic location Industry Reference File (IRF) containing data about rail and motor carrier points for North America and international areas used by railroads to help plan freight movements from origin to destination in an efficient and timely manner. CSM rail station records are uniquely identified by a combination of a Standard Carrier Alpha Code (SCAC) field and Freight Station Accounting Code (FSAC). In addition, CSM stations can be uniquely identified by their respective Standard Point Location Code (SPLC).

Claim: The method by which a transport equipment owner notifies a railroad of a belief that they have been underpaid by the owner.

Customer Identification File (CIF): An IRF that contains the name, physical and mailing addresses, corporate parent identification, and a unique identification code for each location of a transportation carrier customer used in exchanges of information. The purpose of the CIF is to accurately identify transportation company customers and the customers' respective locations.

Cycle: A logical grouping of events and movements that would be rated and reported as a unit.

Equipment Mark: A unique identifier for a piece of railroad or intermodal equipment, consisting of a two to four letter identifier followed by a number up to six digits long, i.e. ABCD 123456. Sometimes used interchangeably with the term Equipment Number, but sometimes merely referring to the two to four letter identifier.

Equipment Number: A unique identifier for a piece of railroad or intermodal equipment, consisting of a two to four letter identifier followed by a number up to six digits long, i.e. ABCD 123456. Sometimes used interchangeably with the term Equipment Mark, but sometimes merely referring to the six digit number.

Freight Station Accounting Code: A carrier-assigned unique number for every station that initiates billing.

Industry Reference File (IRF): File representations of standardized data maintained by Railinc and distributed to the North Americal Railroad Industry. Files include the Customer Identification File (CIF), Mark Register File (MARK) Route File (ROUTE), Shipment Conditions File (SCF), Serving Carrier/Reciprocal Switch (SCRS) File, Centralized Station Master File (CSM) and the Standardized Transportation Commodity Code (STCC) File.

Liability Continuity System (LCS): Developed to create the official interchange record for car hire settlement, LCS analyzes event data from TRAIN II to establish continuity among equipment interchanges, using default records when necessary. LCS was developed so that car hire calculations could be made more accurately.

Mark Owner: The registered owner of a piece of railroad transport equipment identified by an equipment mark, and to whom car hire may be owed.

Mark Register File (MARK): An IRF containing the SCAC abbreviation, the full name and accounting rule 260 number, if a railroad, of a transporter of railroad transport equipment.

Possession: The interim between successive equipment interchanges that a railroad has use of a piece of Railroad Transport Equipment during an accounting month. A possession begins either at the interchange where a railroad acquires use of the equipment or the beginning of the accounting month where possession is carried over from a previous accounting month. A possession ends either at the interchange where the railroad transfers use of the equipment during the accounting month or at the end of the calendar month if the possession carries over until the next calendar month.

Railinc: A wholly owned subsidiary of the Association of American Railroads providing information technology and related services to North America's railroads.

Railroad Transport Equipment: Equipment used to move cargo over railroad tracks. Specific examples include, but are not limited to, rail cars, cargo containers placed on rail cars, and appurtenances such as automobile racks attached to rail cars.

Reclaim: An offset to amounts owed to an owner of railroad transport equipment for the use of that equipment.

Short Route Mileage (SRM): The application of mileage based on the shortest route between two points, regardless of the actual route the equipment took.

Standard Carrier Alpha Code (SCAC): A unique two to four letter code used to identify transportation companies.

Standard Transportation Commodity Code File (STCC): An IRF including a 7-digit numeric industry-defined code that describes a commodity carried by railroad transport equipment, and used on waybills and other shipping documents.

Standard Point Location Code (SPLC): A six to nine digit numeric code assigned to a railroad station to specify the physical location of the station.

Telerail Automated Information Network (TRAIN II): A system that provides physical location information of North American rail equipment as reported by over 330 railroads.

Transfer of Liability (TOL): Introduced in 1994, TOL allows a delivering carrier to transfer responsibility for car hire to a receiving carrier when that carrier cannot accept cars at interchange.

Universal Machine Language Equipment Register (UMLER): A national database hosted by Railinc that contains codes for specific details on individual pieces of equipment, such as internal and external dimensions, carrying capacities, and equipment weight for freight cars.

Waybill: A paper or electronic document for handling and accounting for a shipment of freight.

In addition to the foregoing definitions, a preliminary discussion of reclaims would be helpful to understanding the following disclosure. As stated earlier, a reclaim is an offset to an amount otherwise owed for the use of another's rail transport equipment. Some reclaims are standardized and set out in Car Hire rules adopted by the North American Railroad industry. For example, a standardized reclaim may provide that no car hire is owed for time that damaged equipment is being repaired in a shop, for time and mileage spent when the equipment itself is the freight (being transported, e.g. from the manufacturer or to a repair shop), for time spent waiting to be loaded, etc. Other reclaims are negotiated, and may typically be quite specific. For example, a reclaim may be negotiated between an owner and a railroad that reduces the time and/or mileage rate for a particular type of equipment, equipment over or under a certain weight, equipment carrying certain cargo, etc. Furthermore, some negotiated reclaims provide particular customers with an amount of time "up to" which no car hire accrues for either specific pieces of equipment, or more particularly any equipment of the owner's that a railroad uses.

Although there are myriad variations of reclaims, they may be generally categorized into three groups—rate reclaims, "fixed time" reclaims, and "up to" reclaims. A rate reclaim is a special negotiated rate, either time or mileage, afforded to a railroad that uses a given piece of equipment to which the special rate applies. As stated earlier, the rate reclaim may depend on what equipment is used, what cargo is being carried, where it is being moved, etc., or even a combination of these factors. A "fixed time" reclaim is a reclaim that has determinable, fixed, beginning and end points. For example, standardized reclaims for time a piece of equipment is held short of loading is an example of a "fixed time" reclaim because it applies between the fixed time of when the equipment arrives to be loaded and the time it actually begins to be loaded. A characteristic of a fixed time reclaim is that it offsets the entire car hire amounts otherwise owed during the applicable time. Thus, using the foregoing example, while a car is being held short of loading, neither a time rate nor a mileage rate is applied. Finally, "up to" reclaims allow a railroad the free use of equipment for "up to" a negotiated amount of time.

Figure 2:
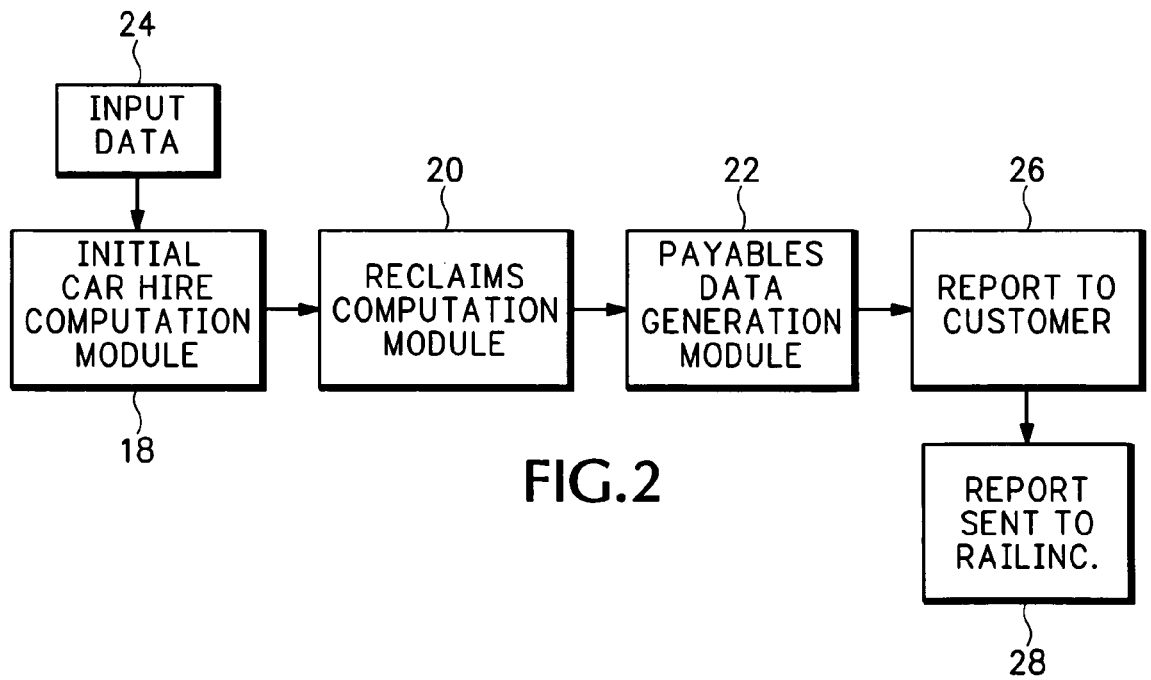
FIG. 2 shows a summary of a process that the payables system of FIG. 1 may use to generate the car hire payables reports.

Referring to FIGS. 1 and 2, an exemplary payables system 10 may be interconnected to exemplary data inputs and outputs 12, 14, and 16. For example, the described payables system 10 receives input data 24 from Railinc 12, TTX 14, and one or more customers 16, and outputs a report 28 to Railinc 12 and a report 26 to the one or more customers from whom input 16 is received. The reports 26 and 28 may be identical or may differ from each other, however the report 28 preferably includes all data a railroad is required to submit to RailInc as part of its monthly reporting obligation. The payables system 10 may preferably be interconnected with the inputs and outputs 12, 14, and 16 through the Internet or other appropriate connection, such as a LAN, capable of transferring data to and from the payables system 10. Alternative payables systems may exclude one or more of the delineated interconnected inputs and outputs, or alternatively include more inputs or outputs than those shown in FIG. 1.

The payables system 10 is intended to calculate car hire amounts on behalf of a customer 16, who in turn is obligated to both report amounts owed to RailInc 12 and pay the amounts due. The calculated car hire amount will typically include two components—an initial car hire amount and a reclaim amount. The initial car hire amount for a car is calculated by an initial car hire module 18 as the sum of a mileage rate applied over miles traveled during a possession, and an hourly rate applied over the duration of a possession. For intermodal equipment, only a daily rate is applied rather than hours and miles. The reclaim amount, which is an offset against the initial car hire amount, is calculated by a reclaims application module 20 according to specific variables either standardized by Car Hire rules or specifically negotiated between the owner and the railroad, or two interchanging railroads. Calculation of both of these amounts by the respective modules 18 and 20 will be discussed in more detail later in this specification. The initial car hire module 18 and the reclaims module 20 provide and/or update information in a payables data generation module 22 which is preferably capable of generating reports sent to both respective customers 16 and RailInc 12 to satisfy the customer's reporting obligation.

The payables system 10 described in this specification has many advantages over existing car hire payables systems. First, the car hire payables system 10 is capable of applying more than one reclaim to a single possession. Second, the payables system 10 does not rely upon a customer manually entering a reclaim code concurrent with a possession to which the reclaim applies, but instead automatically applies reclaims using a novel reclaim queue that selects a combination of reclaims calculated as most cost-beneficial to the railroad customer. Each of these features provide substantial monetary benefits to railroads using transport equipment owned by others. Moreover, the payables system 10 is capable of generating reports daily, giving customers a month-to-date balance from which the customer can estimate an anticipated month end balance owed for planning purposes. Finally the payables system 10 automatically provides RailInc with a customer's car hire data, satisfying that customer's reporting obligation. Preferably, the reports communicate the net amount a customer owes after application of applicable reclaims. Alternatively, the reports can simply report the reclaim amounts so that a customer and/or RailInc can deduct those amounts from car hire owed an owner. Alternatively still, the reports or amounts contained therein may be communicated to the customer through RailInc or vice versa.

Figures 3, 4:
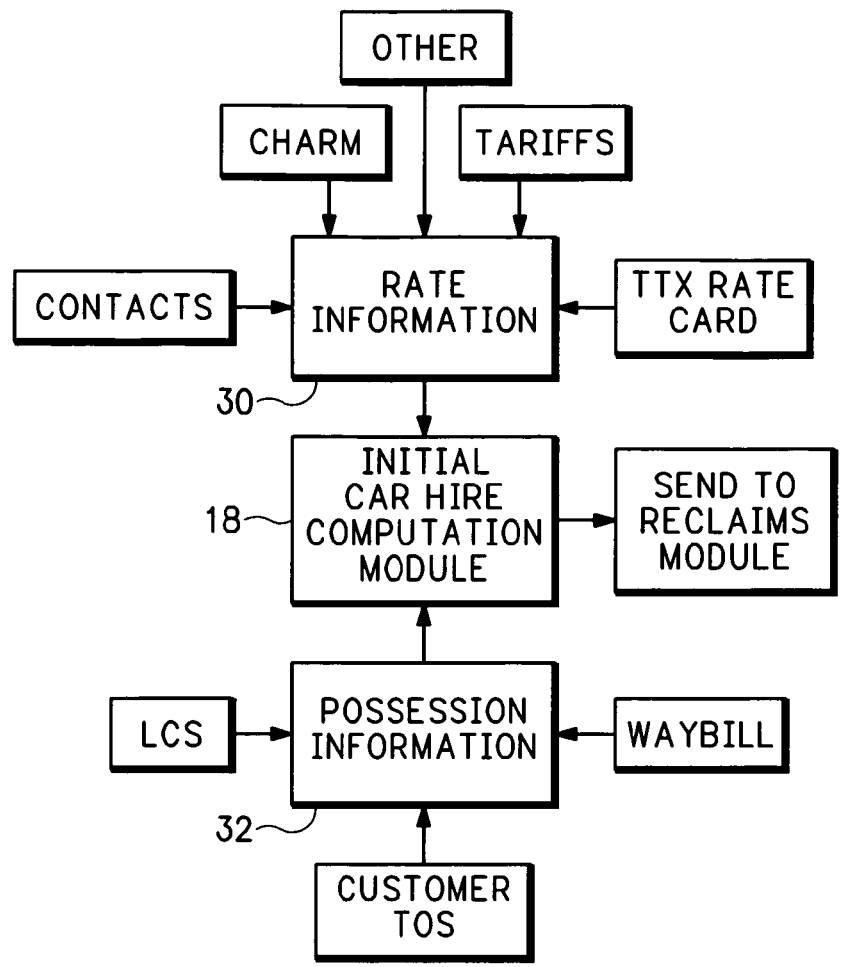
FIG. 3 shows in more detail the initial car hire computation of FIG. 2
FIG. 4 shows a novel reclaims queue used by the reclaims computation module of FIG. 2.
Figure 5:
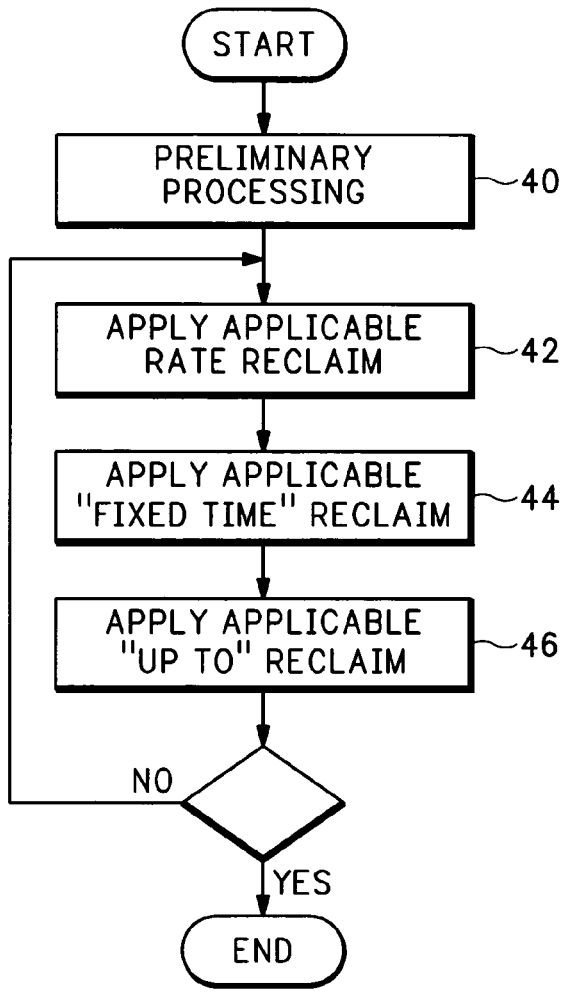
FIG. 5 shows an exemplary summary process used by reclaims computation module shown in FIG. 2.
Figure 6:
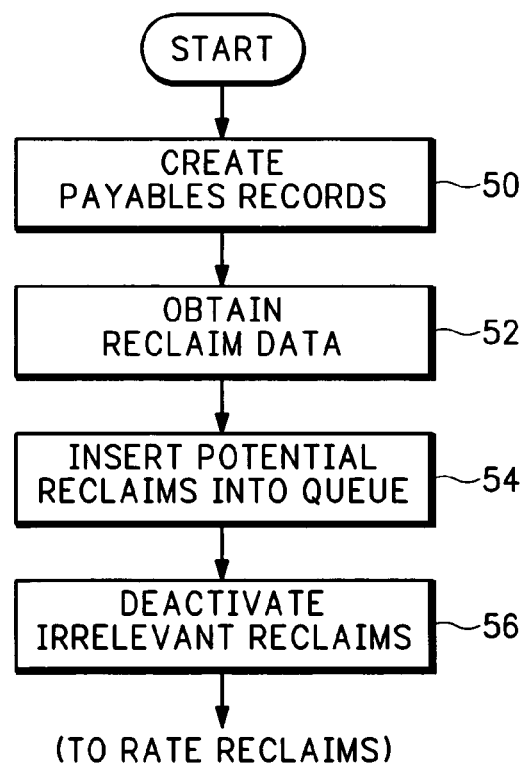
FIG. 6 shows in more detail the preliminary processing module of FIG. 5.

Referring specifically to FIGS. 1 and 3, the initial car hire computation module 18 gathers rate information 30 and possession information 32 from which an initial car hire amount can be computed. Rate information 30 may be gathered from CHARM, which contains default and negotiated rate information, customer contracts, a TTX rate card, tariffs, or any other source from which a relevant time and/or mileage rate may be applied to a possession. CHARM and TTX rate card information is typically accessible electronically over a network connection such as the Internet, while the other information may be accessible either through a network connection with the applicable customer or third party, or alternately stored on a server within or connected to the payables system 10. The payables system 10 preferably gathers rate information from as many sources as possible so that the most applicable rate may be selected. For example, though time and mileage rate information from CHARM for a piece of equipment may be available, the particular customer may have a contract that specifies a different, negotiated rate between the customer and the owner of equipment for which an initial car hire amount is being calculated. By accessing sources of information besides CHARM, the payables system 10 is capable of applying more accurate time and mileage rates.

Similarly, the possession information 32 is preferably compiled from as many sources as possible, such as the LCS system, customer waybills, and customer Train Operating Systems (TOS). Because the possession information from LCS may have been inferred after one or both parties to an interchange fail to report the interchange, the LCS data may result in excess liability. The additional information may then be used by the payables system 10 to more accurately calculate the time and mileage of the possession. Using the applicable rate information 30 and possession information 32, the initial car hire computation module 18 calculates an initial car hire amount, then forwards calculated amounts to the payables data generation module 26. These amounts may then be modified by the reclaims calculation module 20.

Referring to FIG. 4, the reclaims calculation module may include a novel reclaims queue, which in the described embodiment includes all reclaims for which a customer is potentially eligible during an accounting month. Each reclaim is given a unique code and is associated with particular parameters, each of which is required to activate the reclaim. Further, each reclaim is given a priority, with car hire rule reclaims receiving the highest priority. For example, a particular customer may have negotiated a reduced mileage rate for cars owned by X and carrying grain. The parameters associated with this reclaim would be the customer's railroad identifier, the owner's identifier, and an identifier indicating that the cargo is grain. Preferably, each of the parameters are indicated by codes that match those gathered from the inputs 12, 14, and 16. Thus, the parameter for the railroad identifier could be the railroad's SCAC obtained from the MARK IRF, or a customer's waybill, etc., while the parameter for the owner could be the first four letters of the equipment mark, and the parameter for grain could be the seven-digit transportation commodity code. In this manner, once all potential reclaims are compiled in the queue, applicable reclaims may be directly matched to particular possessions using the data available to the payables system 10.

The reclaim queue 34 permits the payables system 10 to provide substantial advantages to customers relative to existing payables systems. First, existing systems require a railroad to manually enter a reclaim code concurrent with a possession being reported to RailInc. This exposes the railroad to two types of costs eliminated by the present system. First, manual entry is prone to error, either by omitting a reclaim code or entering the wrong code, resulting in the reclaim being vacated. By automatically applying reclaims, the payables system 10 avoids such manual errors. Second, and perhaps more importantly, railroad operators may not know, at the time the reclaim code is entered, which reclaim is most beneficial. For example, an operator may apply an "up to" reclaim to a piece of equipment for free use during the first 120 hours of the month, only to later have that equipment held short of a loading point, or break during use requiring repairs. In hindsight, it would have been better to apply a "fixed time" reclaim to the equipment, and then use the "up to" reclaim for the remaining time. The present system, conversely, is capable of updating reclaims on a daily basis so as to maximize the amount of reclaims for which a customer is eligible. A further feature of the disclosed payables system 10 is to generate reports that let customers know, each month, how much money they saved by using the codes entered into the TRAIN II database to compare the reclaims calculated by the LCS system and the payables system 10. It is estimated that a typical customer saves 10-12% using the disclosed payables system 10.

The disclosed payables system 10, using the reclaims queue, achieves yet additional computational accuracy relative to existing systems. Referring to FIGS. 5-9, the reclaims computation module 20 in step 40 undergoes a preliminary processing step 40, in which payables records are created 50 using data inputs from the customer. Payables records preferably include reports for each owner whose equipment the customer used in the accounting month, each report itemizing the equipment used, the net amount owed for the equipment, along with the computational data employed, such as the possessions, the mileage and tile per possession, etc. These reports may then be sent to the customer and RailInc. Once payables records are created, the preliminary processing step 40 collects information in step 52 from the assorted inputs 12, 14, and 16 that are needed to assess the applicability in the current accounting month of potential reclaims of a customer that are loaded into the queue 34 in step 54. Once the potential reclaims are loaded into the queue, the information obtained in step 52 is preliminarily used to deactivate any reclaims in the queue not applicable in the current accounting month. For example, if a particular potential reclaim is for a piece of equipment that the information of step 52 shows as not being used by the customer during the month (zero time), that reclaim will be deactivated before the reclaim queue is processed by the further steps 42, 44, and 46 shown in FIG. 5.

Figure 7:
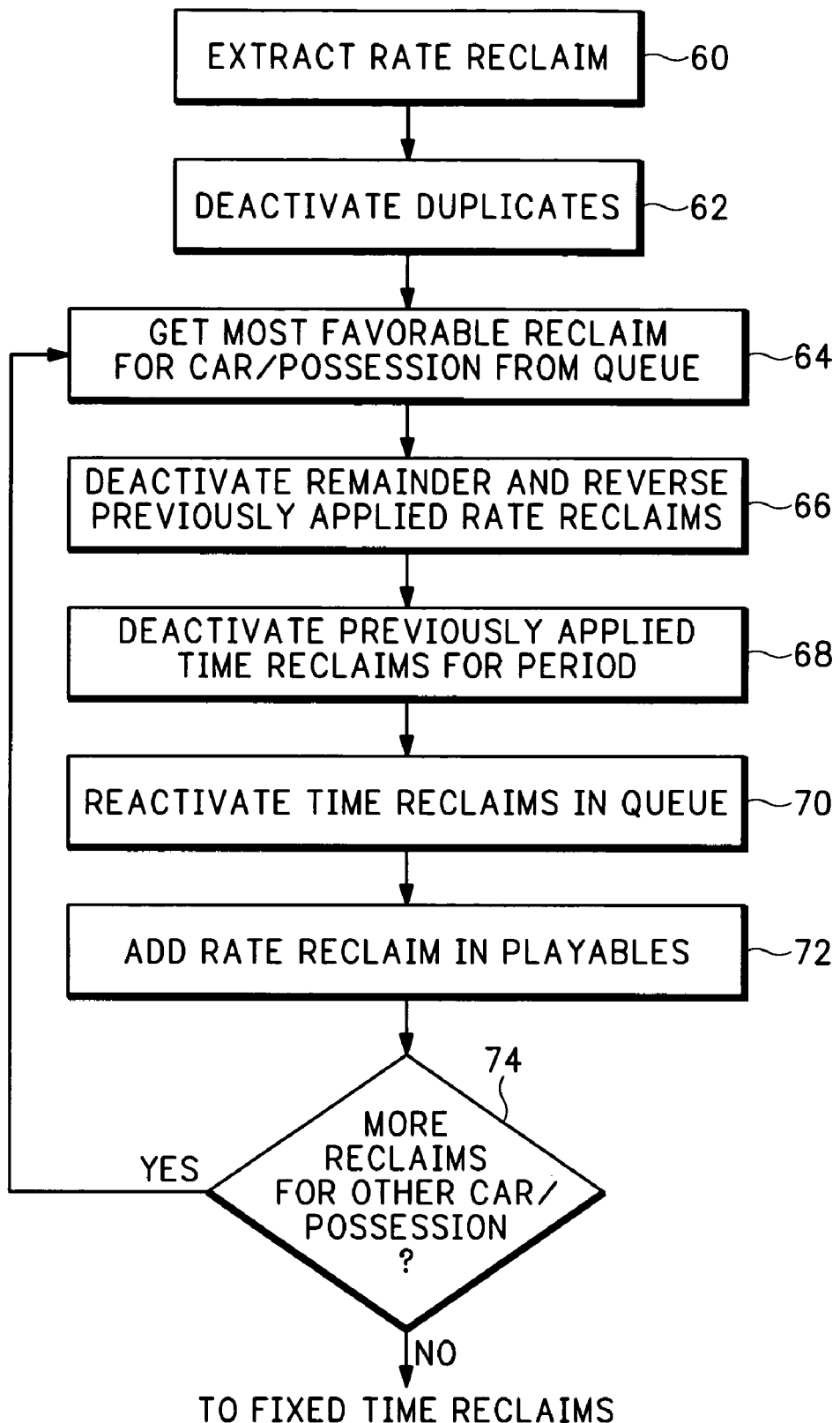
FIG. 7 shows in more detail rate reclaim module of FIG. 5.
Figure 8:
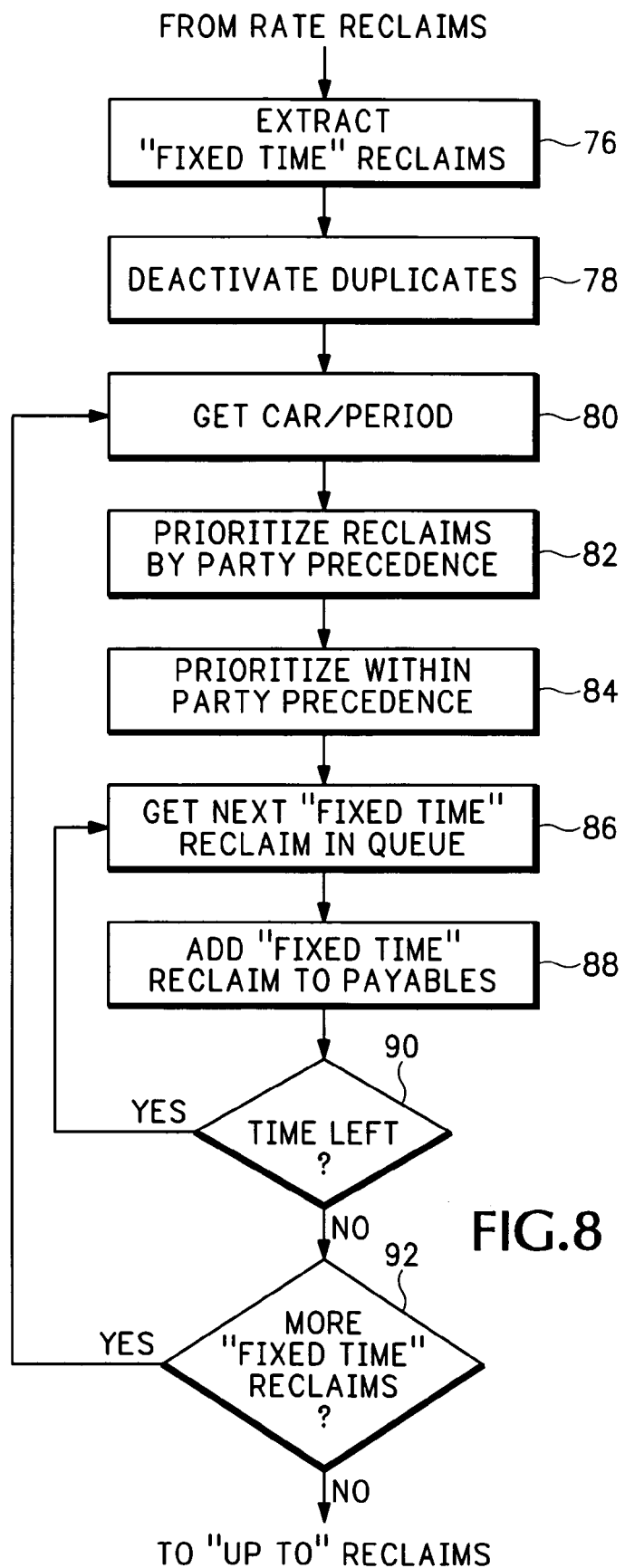
FIG. 8 shows in more detail the "fixed time" reclaim module of FIG. 5.
Figure 9:
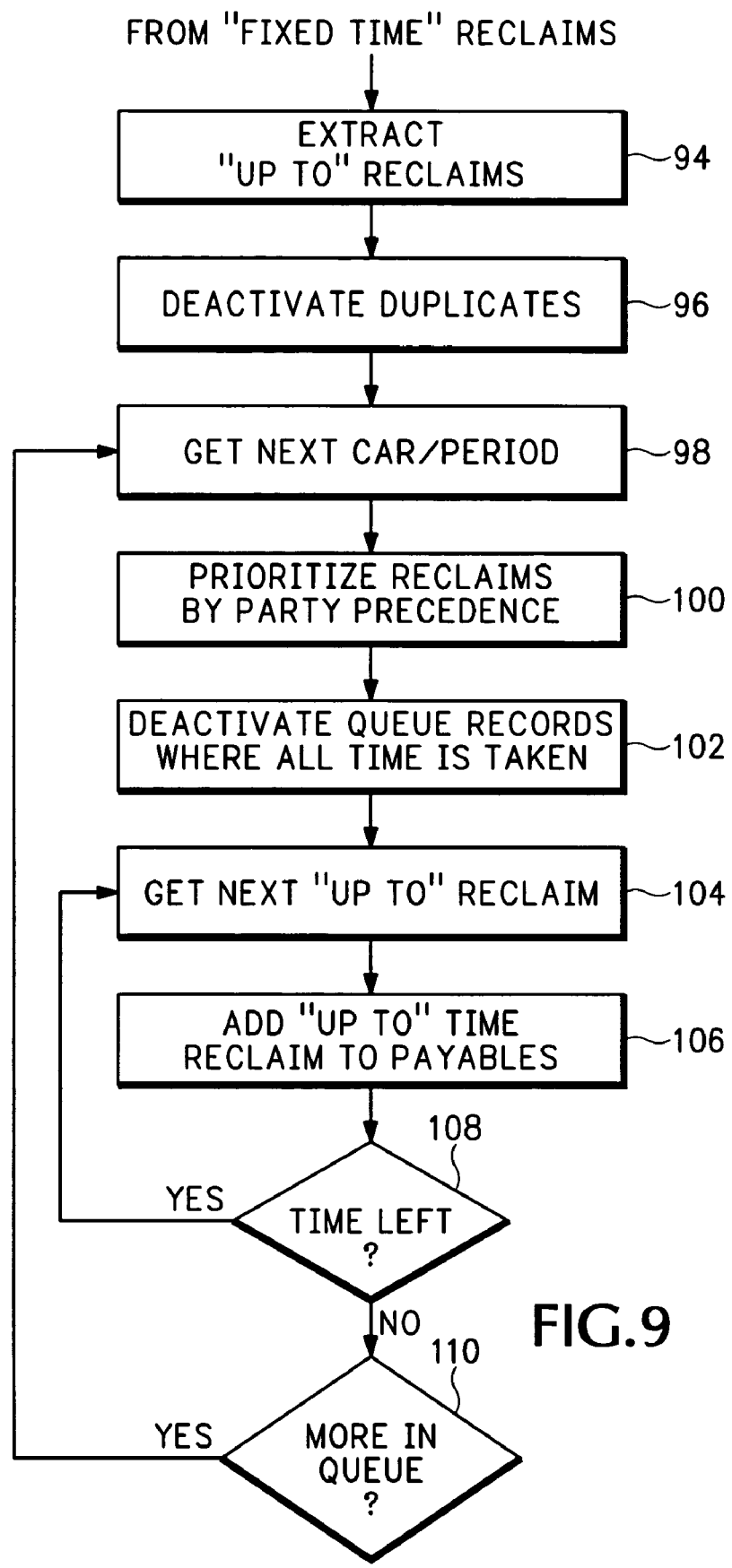
FIG. 9 shows in more detail the "up to" reclaim module of FIG. 5.

After deactivation of reclaims inapplicable to the accounting month, the reclaim queue 34 is used to apply reclaims to particular equipment/possession combinations as shown in FIGS. 7-9. The rate reclaim selection step 60 will analyze, in sequence, each equipment/possession combination and apply the most favorable rate reclaim for the respective combination in step 64. In the disclosed system, only one rate reclaim is allowed per cycle and that reclaim must be for the entire cycle. In other alternate systems, multiple rate reclaims may apply during a possession where rate reclaims are divided among different portions of the possession, e.g. if a customer possessed a car for an entire month, transports grain eligible for one rate reclaim during the first half of the month and is still eligible for a lesser negotiated rate reclaim during the remainder of the month due to, for example, the type of car.

In step 66, if a rate reclaim is applied to a piece of equipment for a possession, any rate reclaim applied in a previous day in the accounting month is reversed and the remainder of the rate reclaims for that piece of equipment will be deactivated. (It should be understood that this deactivation will have no effect on reclaims for other pieces of equipment because each reclaim is associated with parameters, each of which must be present for the reclaim to be applicable. Thus, if a particular owner grants a reclaim applicable to more then one piece of equipment used during the relevant accounting month, the queue will include an individually corresponding reclaim for each piece of equipment.)

In step 68, if a rate reclaim has been applied at step 64, any "fixed time" and "up to" reclaims previously applied to the equipment is reversed in the payables records created in step 50, and in step 70, all potential such "fixed time" and "up to" reclaims in the queue, which may have been deactivated in a prior day's processing, are reactivated. These two steps allow the recalculation of the most beneficial time reclaims in light of the newly applied rate reclaim. For example, a rate reclaim may be based on a commodity such as coal. The waybill showing that the commodity is coal may not be received immediately, in which case a higher default CHARM rate along with a standard "up to" reclaim using the default rate are applied on that first day. The following day the waybill may arrive showing the coal commodity, so the reclaim from the previous day is reversed, the reclaim for lower rate is applied, and the "up to" claim is reapplied against the lower net value.

Once steps 70 and 72 are completed, any newly added rate reclaim is added to the applicable payables record created in step 50 and at a decision step 74, either more reclaims are evaluated if any are left in the queue for other equipment, or processing proceeds to the step 44 of applying applicable fixed time reclaims to equipment used by the customer. Referring specifically to FIG. 8, any "fixed time" reclaims in the queue are extracted in step 76 and duplicates are deactivated in step 78. In order to apply fixed time reclaims in the most cost-effective manner, potential reclaims for each piece of equipment are first sorted in steps 80-84. As stated previously, fixed time reclaims typically negate all care hire amounts during the fixed time intervals between which certain circumstances have occurred, such as a car being held short of loading, or a car being repaired. To facilitate efficient association of all available fixed time reclaims with used equipment, the use of each piece of equipment is divided into "cycles" which are logical contiguous groupings of equipment movements and non-movement events, such as loading/unloading, repair, etc. For example, one cycle might include an empty railcar being moved to a loading location, then being held short of that location for a specified duration, and a subsequent cycle might include the car being loaded and moved to a destination.

In step 80, potential reclaims for a particular car/cycle combination are selected and first sorted in step 82 by of precedence of the reclaim party. In the system described in this disclosure, that precedence is (1) reclaims specifically forced as highest priority (2) reclaims against the owner of the equipment and (3) reclaims against a third party, such as the railroad that delivered the equipment to the customer at an interchange. Then in step 84, within each party precedence, reclaims are further sorted in order of (i) reclaims against the full possession of the equipment (ii) reclaims against a full cycle; and (iii) reclaims against a partial cycle. Once sorted, the highest priority reclaim is selected against the equipment in step 86, and added to the payables records in step 88. At decision step 90, if there is time left in the cycle (which means that some car hire is still owed for that equipment/cycle combination), then the reclaim with the next highest priority is evaluated until either all the time in the cycle is accounted for or no more fixed time reclaims apply to the particular equipment/cycle combination. At decision step 90, if the queue contains additional fixed time reclaims (which must, by the time that step is reached, apply to one or more different equipment/cycle combinations than those previously evaluated), then the next equipment/cycle combination is evaluated, else processing proceeds to the "up to" reclaims processing module 46.

The process described in the preceding paragraph assures that the maximum possible value of the available "fixed time" reclaims will be applied to each cycle for a particular piece of equipment. Assume, for example, that a cycle for a piece of equipment includes transferring an empty hopper car to a loading point where it waits six hours to be loaded with coal at which point the cycle ends. One potential "fixed time" reclaim may be for time spent while empty while another potential "fixed time reclaim" is for the six-hour waiting period, both applied against an owner. The ordering process will apply the former reclaim first, which applies to the entire cycle at which is the maximum possible (zeroed out) reclaim for that cycle. Assume, alternatively, that a railroad has placed the equipment at the loading location, where it sits for six hours and then is loaded with coal and moves to a destination for unloading. In route, the car is damaged and the railroad agrees to immediately buy it, at which point any subsequent time and mileage are allowed a reclaim. If the cycle is defined as including this entire period, then neither reclaim applies to either the entire possession or the entire cycle. One will be selected first, then, because time is still remaining in the cycle, the next will be selected and applied.

Referring to FIG. 9, once all applicable "fixed time" reclaims have been applied to each piece of transport equipment, processing proceeds to apply any applicable "up to" reclaims by first extracting, in step 94, all potential "up to" reclaims for the customer, again deactivating duplicates at step 96. At steps 98 and 100, similar to the procedure for applying "fixed time" reclaims, the "up to" reclaims in the queue are sorted and applied in equipment/cycle combinations with reclaims for each combination prioritized by forced reclaims, reclaims against the owner, and reclaims against a third party. Once a particular equipment/cycle is selected in step 98 with its reclaims prioritized in step 100, step 102 deactivates any "up to" reclaim for which all the time has been previously applied to other equipment/cycle combinations. The next "up to" reclaim still active is applied to the equipment/cycle combination at step 104, and added to the payables record at step 106. If there is still time left on the "up to" reclaim, the next car/cycle combination is selected and processed. This entire procedure is repeated at decision step 110 so long as more "up to" reclaims are left in the queue.

Preferably, the equipment/cycle combinations are prioritized by the rate applied to the equipment so that "up to" reclaims will first be applied to equipment that has the highest rate, saving the customer the most money. More preferably, the rates are compared after being adjusted by the rate reclaim module 42, so that even where two pieces of equipment have the same default rate in CHARM, the "up to" reclaim will be first applied to equipment that has either not been discounted, or discounted less than the other piece.

Also, each potential "up to" reclaim may optionally include a flag that indicates whether it is "exclusive" or "inclusive." An "exclusive" flag means that it can only be taken against the particular party being reclaimed while an "inclusive" flag means that it can be taken against any party. Because inclusive "up to" reclaims can be applied across multiple owners, they are more likely to be fully utilized. Conversely, to fully utilize exclusive "up to" reclaims, the system 10 preferably "wraps" them, if possible, around a "fixed time" reclaim on the same piece of equipment. Assume, for example, that a railroad negotiated an "up to" reclaim with a particular owner for a railroad car being used to transport automobiles. In the middle of the possession, the car was eligible for a "fixed time" reclaim, which was applied. When the system 10 begins to process the "up to" reclaim for that piece of equipment, it may first apply the reclaim to the beginning portion of the cycle, prior to the "fixed time reclaim" negating any car hire owed. Then, if there remains any time left on the "up to" reclaim, it is applied from a point beginning at the end of the "fixed time" reclaim. In this manner, should that piece of equipment be the only one used by the particular owner for which the "up to" reclaim is allowed in the accounting month, it will be used to the fullest extent possible.

Another distinguishing feature of the system 10 is that it is capable of taking the last part of a possession for an "up to" reclaim rather than the first part of that possession. One situation in which this would be more beneficial is an outbound switching reclaim from release loaded to interchanged offline against the interchanging railroad in lieu of using a Transfer of Liability.

A further distinguishing feature of the system 10 is that reclaims are taken in the months for which they apply. The existing systems for calculating car hire will wait until a possession is complete before applying a reclaim. Thus, in those existing systems, where a possession occurs over consecutive months, but the reclaim applies during the first month, the railroad must first pay the full amount of car hire for the portion of the possession in the first month, but then be credited for the reclaim in the second month. The currently disclosed system 10, however, allows railroad customers to immediately realize the benefits of their reclaims.

Finally, the currently disclosed system allows a reclaim against a cycle to be manually entered using user interface. That reclaim trumps all other reclaims as the highest priority reclaim unless the manually entered reclaim is invalidated by subsequently obtained information. If the manually entered reclaim is invalidated, the client is notified of such invalidation so that appropriate action may be taken.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only the claims that follow.

We claim:

1. An automated system comprising:
   (a) a memory storing a plurality of potential reclaims in a reclaim queue, each associated with at least one parameter, where said plurality of potential reclaims includes at least one combination of said plurality of potential reclaims mutually exclusive with another combination of said plurality of potential reclaims; and
   (b) a processor that selectively, automatically applies a selected one of said combinations of potential reclaims to at least one movement cycle of a unit of railroad transport equipment, so as to maximize the total value of the selectively applied combination, by a comparison of said at least one parameter to numerical codes for said movement cycle, each numerical code respectively representing statistical information about said movement cycle, wherein the term "mutually exclusive" means that only one of two combinations of said plurality of reclaims can be applied to a movement cycle.

2. The automated system of claim 1 where said numerical codes are received from Telerail Automated Information Networks.

3. The automated system of claim 1 where said memory stores a plurality of reclaims, each of said plurality of reclaims being a respective one of at least two reclaim types selected from the group consisting of rate reclaims, fixed time reclaims, and up-to reclaims.

4. The automated system of claim 3 where every reclaim in said memory is of a type selected from the group consisting of rate reclaims, fixed time reclaims, and up-to reclaims.

5. The automated system of claim 3 where said processor:
(a) receives numerical codes each respectively associated with one of at least two ongoing movement cycles;
(b) receives at least one potential reclaim for each of said at least two ongoing movement cycles;
(c) selectively applies a rate reclaim to at least one of said at least two ongoing movement cycles; and
(d) selectively applies an up-to reclaim to a processor-selected at least one ongoing movement cycle based upon said applied rate reclaim.

6. The automated system of claim 3 where said processor:
(a) receives numerical codes each respectively associated with one of at least two ongoing movement cycles;
(b) receives at least one potential reclaim for each of said at least two ongoing movement cycles;
(c) selectively applies a fixed time reclaim to at least one of said at least two ongoing movement cycles; and
(d) selectively applies an up-to reclaim to a processor-selected at least one ongoing movement cycle based upon said applied fixed time reclaim.

7. The automated system of claim 1 where said processor automatically deactivates a previously-applied reclaim for which said movement cycle is eligible.

8. The automated system of claim 1 where said processor:
(a) selectively applies a first reclaim from said plurality of potential reclaims to an ongoing movement cycle based on a comparison of the said numerical codes associated with said ongoing movement cycle to the said at least one parameter associated with said first reclaim; and
(b) uses the applied said first reclaim to automatically select a second reclaim, from among a subset of mutually exclusive reclaims within said plurality of potential reclaims, to also apply to said ongoing movement cycle, where said ongoing movement cycle is eligible for each of said mutually exclusive reclaims in said subset, individually.

* * * * *

UNITED STATES PATENT AND TRADEMARK OFFICE
CERTIFICATE OF CORRECTION

PATENT NO. : 8,150,780 B2
APPLICATION NO. : 11/521818
DATED : April 3, 2012
INVENTOR(S) : Gary Edward Brandt et al.

Page 1 of 1

It is certified that error appears in the above-identified patent and that said Letters Patent is hereby corrected as shown below:

IN THE SPECIFICATIONS:

Col. 10, Line 27

Change "care" to read --car--.

Signed and Sealed this
Nineteenth Day of March, 2013

Teresa Stanek Rea
*Acting Director of the United States Patent and Trademark Office*